United States Patent
Wager et al.

(10) Patent No.: US 11,997,738 B2
(45) Date of Patent: May 28, 2024

(54) SYSTEMS AND METHODS FOR THE HANDLING OF DATA RADIO BEARER INTEGRITY PROTECTION FAILURE IN NR

(71) Applicant: TELEFONAKTIEBOLAGET LM ERICSSON (PUBL), Stockholm (SE)

(72) Inventors: Stefan Wager, Espoo (FI); Oumer Teyeb, Solna (SE); Karl Norrman, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 598 days.

(21) Appl. No.: 16/615,118

(22) PCT Filed: Jun. 12, 2018

(86) PCT No.: PCT/IB2018/054252
§ 371 (c)(1),
(2) Date: Nov. 19, 2019

(87) PCT Pub. No.: WO2018/229657
PCT Pub. Date: Dec. 20, 2018

(65) Prior Publication Data
US 2020/0169887 A1 May 28, 2020

Related U.S. Application Data

(60) Provisional application No. 62/521,292, filed on Jun. 16, 2017.

(51) Int. Cl.
*H04W 76/19* (2018.01)
*H04W 12/106* (2021.01)
(Continued)

(52) U.S. Cl.
CPC ......... *H04W 76/19* (2018.02); *H04W 12/106* (2021.01); *H04W 12/121* (2021.01);
(Continued)

(58) Field of Classification Search
CPC .............. H04W 76/19; H04W 12/106; H04W 12/1201; H04W 12/10; H04W 76/27;
(Continued)

(56) References Cited

U.S. PATENT DOCUMENTS

| | | | |
|---|---|---|---|
| 2004/0229627 A1* | 11/2004 | Malladi ............... | H04W 12/106 455/450 |
| 2009/0025060 A1* | 1/2009 | Mukherjee ............ | H04W 12/08 380/270 |

(Continued)

FOREIGN PATENT DOCUMENTS

| | | | | |
|---|---|---|---|---|
| CN | 107529159 A | * | 12/2017 | ............ H04W 12/02 |
| CN | 108243144 A | * | 7/2018 | ............. H04L 69/06 |

(Continued)

OTHER PUBLICATIONS

3rd Generation Partnership Project, "Technical Specification Group Services and System Aspects; 3GPP System Architecture Evolution (SAE); Security architecture (Release 15)", Technical Specification, 3GPP TS 33.401 V15.0.0, Jun. 14, 2017, pp. 1-154, 3GPP, France.

(Continued)

*Primary Examiner* — Shah M Rahman
(74) *Attorney, Agent, or Firm* — Sage Patent Group

(57) ABSTRACT

According to certain embodiments, a method by a wireless device includes detecting an integrity check failure associated with a Packet Data Convergence Protocol (PDCP) data Protocol Data Unit (PDU). In response to detecting the integrity check failure, the PDCP data PDU is discarded and an indication is sent to a network node. The indication informs the network node of the integrity check failure.

12 Claims, 13 Drawing Sheets

(51) Int. Cl.
*H04W 12/121* (2021.01)
*H04W 76/27* (2018.01)
*H04W 76/30* (2018.01)
*H04W 80/02* (2009.01)

(52) U.S. Cl.
CPC .......... *H04W 76/27* (2018.02); *H04W 76/30* (2018.02); *H04W 80/02* (2013.01)

(58) Field of Classification Search
CPC ... H04W 76/30; H04W 80/02; H04W 12/121; H04L 69/324
See application file for complete search history.

(56) References Cited

U.S. PATENT DOCUMENTS

| | | | | |
|---|---|---|---|---|
| 2010/0246382 A1* | 9/2010 | Yi | ............................ | H04L 69/22 370/216 |
| 2012/0224525 A1* | 9/2012 | Wang | .................... | H04W 36/18 370/328 |
| 2012/0290870 A1* | 11/2012 | Shah | ..................... | H04L 63/123 714/E11.073 |
| 2013/0148490 A1* | 6/2013 | Yi | ........................ | H04W 76/19 370/216 |
| 2013/0235803 A1* | 9/2013 | Yi | ....................... | H04W 12/106 370/328 |
| 2014/0036685 A1* | 2/2014 | Kim | ..................... | H04W 76/27 370/236 |
| 2014/0119276 A1* | 5/2014 | Boudreau | ............... | H04W 4/00 370/328 |
| 2014/0192631 A1* | 7/2014 | Yi | ........................ | H04W 76/18 370/216 |
| 2016/0226643 A1* | 8/2016 | Mallik | .................. | H04L 1/1896 |
| 2016/0302075 A1* | 10/2016 | Dudda | ............... | H04W 12/106 |
| 2016/0316373 A1* | 10/2016 | Gupta | .................. | H04W 48/04 |
| 2017/0215225 A1* | 7/2017 | Yi | ....................... | H04W 12/037 |
| 2017/0245252 A1* | 8/2017 | Gao | .................... | H04W 28/085 |
| 2017/0353862 A1* | 12/2017 | Do | ....................... | H04L 63/102 |
| 2018/0124642 A1* | 5/2018 | Phuyal | ............. | H04W 28/0819 |
| 2018/0234839 A1* | 8/2018 | Tenny | ............... | H04W 36/0033 |
| 2018/0270668 A1* | 9/2018 | Nair | ..................... | H04W 76/10 |
| 2020/0205003 A1* | 6/2020 | Ingale | .................. | H04W 12/04 |
| 2020/0305225 A1* | 9/2020 | Zhang | ................. | H04W 36/305 |
| 2021/0112610 A1* | 4/2021 | Xiao | .................... | H04L 1/1614 |

FOREIGN PATENT DOCUMENTS

| | | | | |
|---|---|---|---|---|
| WO | WO-2017138977 A1 * | 8/2017 | ............ | H04W 36/18 |
| WO | WO-2018230974 A1 * | 12/2018 | ............. | H04L 12/04 |

OTHER PUBLICATIONS

3rd Generation Partnership Project, "Technical Specification Group Radio Access Network; NR; Packet Data Convergence Protocol (PDCP) specification (Release 15)", Technical Specification, 3GPP TS 38.323 V15.0.0, May 14, 2017, pp. 1-24, 3GPP, France.

3rd Generation Partnership Project, "Technical Specification Group Radio Access Network; Evolved Universal Terrestrial Radio Access (E-UTRA); Packet Data Convergence Protocol (PDCP) specification (Release 13)", Technical Specification, 3GPP TS 36.323 V13.5.0, Mar. 21, 2017, pp. 1-40, 3GPP, France.

* cited by examiner

SYSTEMS AND METHODS FOR THE HANDLING OF DATA RADIO BEARER INTEGRITY PROTECTION FAILURE IN NR

This application is a 371 of International Application No. PCT/IB2018/054252, filed Jun. 12, 2018, which claims priority to U.S. Provisional Application No. 62/521,292, filed Jun. 16, 2017, the disclosures of which are fully incorporated herein by reference.

TECHNICAL FIELD

The present disclosure relates, in general, to wireless communications and, more particularly, systems and methods for the handling of data radio bearer (DRB) integrity protection failure in NR.

BACKGROUND

The following section describes the integrity protection and verification functionality in LTE as described in 36.323. This will be the basis also for NR. In NR, SA3 has agreed also to include integrity protection for the user plane.

2.1.1 Integrity Protection and Verification in LTE

The integrity protection function includes both integrity protection and integrity verification and is performed in PDCP for PDCP entities associated with SRBs and DRBs the that needs integrity protection. The data unit that is integrity protected is the PDU header and the data part of the PDU before ciphering.

For RNs, the integrity protection function is performed also for PDCP entities associated with DRBs if integrity protection is configured.

The integrity protection algorithm and key to be used by the PDCP entity are configured by RRC and the integrity protection method shall be applied as specified in 33.401.

The integrity protection function is activated/suspended/resumed by RRC. When security is activated and not suspended, the integrity protection function shall be applied to all PDUs including and subsequent to the PDU indicated by upper layers RRC for the downlink and the uplink, respectively.

NOTE: As the RRC message which activates the integrity protection function is itself integrity protected with the configuration included in this RRC message, this message needs to first be decoded by RRC before the integrity protection verification could be performed for the PDU in which the message was received.

For downlink and uplink integrity protection and verification, the parameters that are required by PDCP for integrity protection are defined in 33.401 and are input to the integrity protection algorithm. The required inputs to the integrity protection function include the COUNT value, and DIRECTION. The parameters required by PDCP which are provided by RRC are listed below:

BEARER;
KEY ($K_{RRCint}$).
for RNs, KEY ($K_{UPint}$)

At transmission, the UE computes a value X-MAC based on the input parameters as specified above. The UE then compares the computed value with the contents of the field MAC-I which is contained in the received PDCP PDU. If the calculated X-MAC corresponds to the received MAC-I, integrity protection is verified successfully.

2.1.2 COUNT

For synchronizing ciphering and integrity protection, a counter COUNT is maintained in the UE and the eNB. The value of the counter is referred to as COUNT value below. Sometimes the value is referred to simply as COUNT when no confusion can arise. Each PDCP PDU is associated with a COUNT value. FIG. 1 illustrates an example format of the count value. As depicted, the COUNT value is composed of a HFN and the PDCP SN. The length of the PDCP SN is configured by upper layers.

The size of the HFN part in bits is equal to 32 minus the length of the PDCP SN.

NOTE: When performing comparison of values related to COUNT, the UE takes into account that COUNT is a 32-bit value, which may wrap around (e.g., COUNT value of $2^{32}-1$ is less than COUNT value of 0).

2.1.3 PDCP Receive Procedure

The PDCP reception procedure in the UE for SRBs is described in section 5.1.2.2 of 36.323. Below is a copy of the procedure:

For SRBs, at reception of a PDCP Data PDU from lower layers, the UE shall:
if received PDCP SN<Next_PDCP_RX_SN:
decipher and verify the integrity of the PDU (if applicable) using COUNT based on RX_HFN+1 and the received PDCP SN as specified in the subclauses 5.6 and 5.7, respectively;
else:
decipher and verify the integrity of the PDU (if applicable) using COUNT based on RX_HFN and the received PDCP SN as specified in the subclauses 5.6 and 5.7, respectively;
if integrity verification is applicable and the integrity verification is passed successfully; or
if integrity verification is not applicable:
if received PDCP SN<Next_PDCP_RX_SN:
increment RX_HFN by one;
set Next_PDCP_RX_SN to the received PDCP SN+1;
if Next_PDCP_RX_SN>Maximum_PDCP_SN:
set Next_PDCP_RX_SN to 0;
increment RX_HFN by one;
deliver the resulting PDCP SDU to upper layer:
else, if integrity verification is applicable and the integrity verification fails:
discard the received PDCP Data PDU;
indicate the integrity verification failure to upper layer.

FIG. 2 also illustrates the Packet Data Convergence Protocol (PDCP) reception procedure in the user equipment (UE). The procedure begins with the receiver deciphering and verifying integrity protection of the received protocol data unit (PDU). The PDCP sequence number (SN) is compared against the next expected PDCP SN and the hyper frame number (HFN) is adjusted appropriately to account for PDCP SN wrap around.

The integrity verification procedure in the PDCP receiving entity takes a COUNT based on received PDUs SN and assumed HFN into account. The procedure succeeds if the assumed COUNT is the same as used by the transmitting entity for integrity protection, as well as if the PDUs content is equal.

If deciphering and integrity verification succeeds, the local variables (RX_HFN and Next_PDCP_RX_SN) are updated according to the received PDCP SN, and the PDCP SDU is delivered to higher layers. If the integrity verification fails, the PDCP SDU is discarded, and a notification is sent to higher layers that the integrity verification failed.

When the UE detects integrity protection check failure, it will not know what caused it. There are at least two possible causes. First, there may be a mismatch in the content of the message sent and what was received. This could be because of a bad radio channel or a man in the middle attack. An attacker may be injecting rogue data into the established traffic channel, raising the subscriber's bill, or simply wasting network or device resources. Second, there may be a mismatch between the COUNT values maintained in UE and network. Such a mismatch will cause deciphering to create garbage. Thus, quick detection and correction of the mismatch is needed.

SUMMARY

To address the foregoing problems with existing solutions, disclosed is systems and methods for handling data radio bearer (DRB) integrity protection failure in NR. In certain embodiments, the systems and methods may be implemented in or by a wireless device, which may include a user equipment (UE), and/or a network node, which may include a eNodeB (eNB) or gNodeB (gNB).

According to certain embodiments, a method by a wireless device includes detecting an integrity check failure associated with a Packet Data Convergence Protocol (PDCP) data Protocol Data Unit (PDU). In response to detecting the integrity check failure, the PDCP data PDU is discarded and an indication is sent to a network node. The indication informs the network node of the integrity check failure.

According to certain embodiments, a wireless device includes processing circuitry configured to detect an integrity check failure associated with a PDCP data PDU. In response to detecting the integrity check failure, the PDCP data PDU is discarded and an indication is sent to a network node. The indication informs the network node of the integrity check failure.

According to certain embodiments, a method in a network node includes storing a plurality of downlink (DL) COUNTs for a number of associated PDCP data PDUs. An indication is received from a wireless device of an integrity check failure for a particular PDCP data PDU with a particular DL COUNT. It is determined whether the particular DL COUNT matches one of the plurality of DL COUNTS and a network action is performed based on whether the particular DL COUNT matches one of the plurality of DL COUNTs.

According to certain embodiments, a network node includes processing circuitry configured to store a plurality of DL COUNTs for a number of associated PDCP data PDUs. An indication is received from a wireless device of an integrity check failure for a particular PDCP data PDU with a particular DL COUNT. The processing circuitry is configured to determine whether the particular DL COUNT matches one of the plurality of DL COUNTS and perform a network action based on whether the particular DL COUNT matches one of the plurality of DL COUNTs.

Certain embodiments of the present disclosure may provide one or more technical advantages. For example, certain embodiments may enable the network to quickly detect and remedy possible integrity check failures. In certain embodiments, failure detection may be quicker and more reliable than a currently defined counter check procedure, which is a network triggered procedure to check a current COUNT value of the wireless device. Another technical advantage may be graceful recovery mechanisms that do not include releasing all of the DRBs and signaling radio bearers (SRBs) for the wireless device.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Particular embodiments of the present disclosure may provide solutions for handling DRB integrity protection failure in NR. According to certain embodiments, the solutions enable a wireless device to quick inform the network about detected integrity check failures. Particular embodiments are described in FIGS. 1-14 of the drawings, like numerals being used for like and corresponding parts of the various drawings.

According to certain embodiments, a wireless device may send an indication to the network about failed integrity protection checksum. The indication may also include the current COUNT value of the wireless device. Providing the current COUNT value may enable the network node to determine if the integrity check failure was caused by COUNT mismatch or an intruder injecting packets. The action taken by the network may be different depending on the cause of the integrity check failure.

Figure 1:
FIG. 1 illustrates the format of a count.
Figure 3:
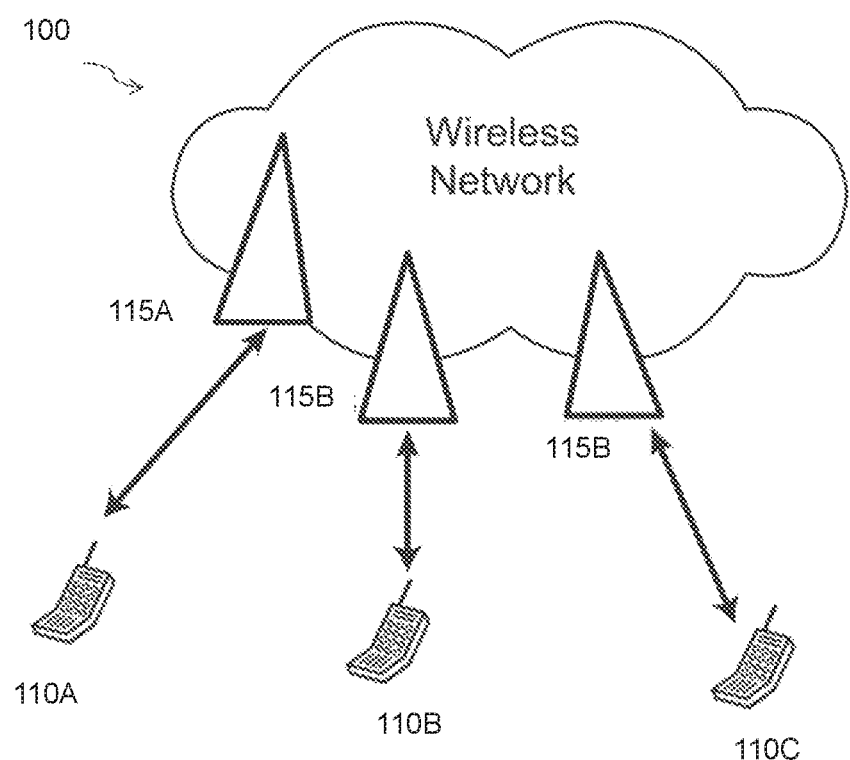
FIG. 3 illustrates an example wireless network for handling data radio bearer (DRB) integrity protection failure in NR, according to certain embodiments.
Figure 2:
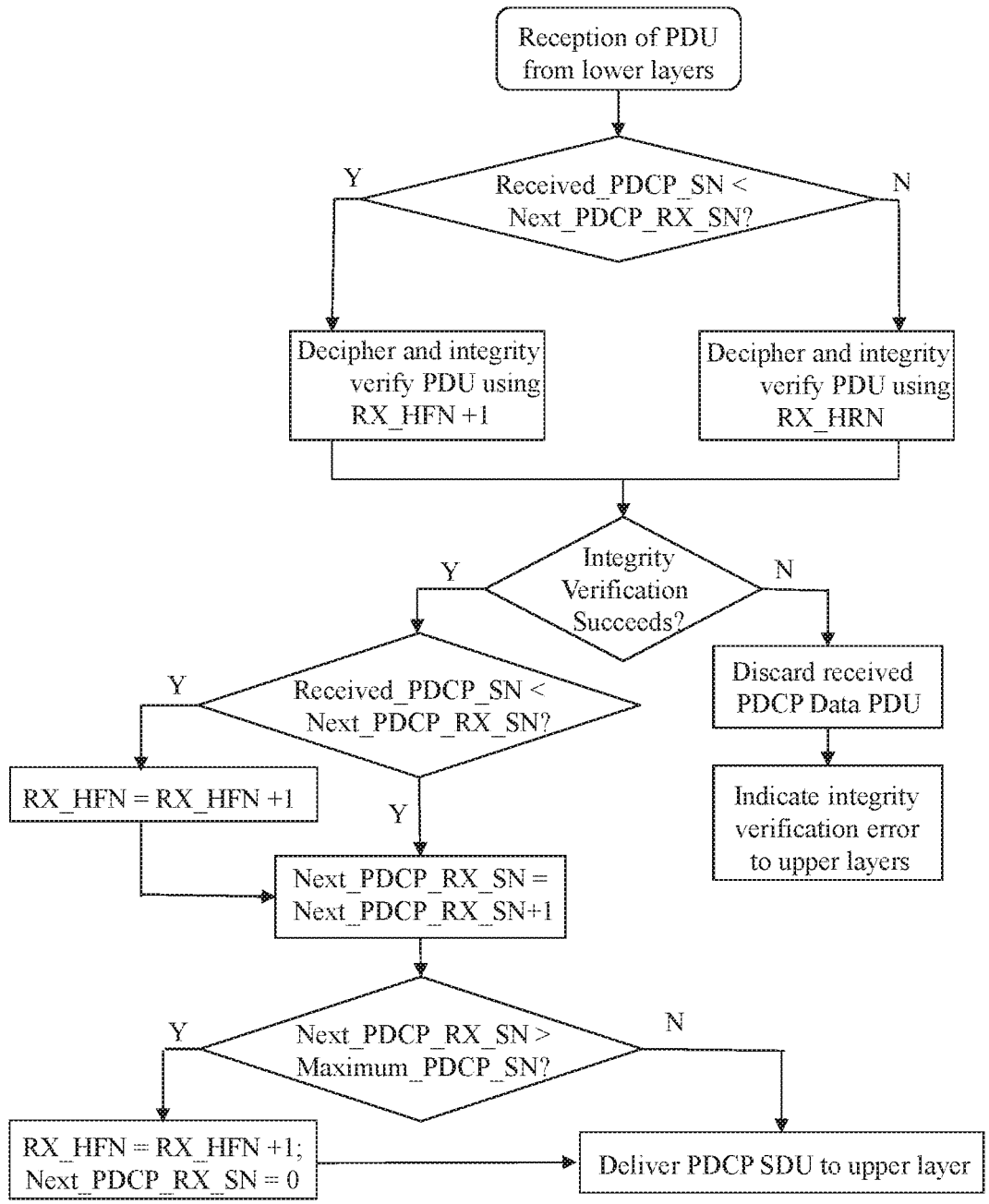
FIG. 2 illustrates the PDCP reception procedure in a user equipment (UE)

FIG. 3 illustrates a wireless network 100 for handling DRB integrity protection failure in NR, in accordance with certain embodiments. Network 100 includes one or more wireless devices 110A-C, which may be interchangeably referred to as wireless devices 110 or UEs 110, and network nodes 115A-C, which may be interchangeably referred to as network nodes 115 or eNodeBs 115. A wireless device 110 may communicate with network nodes 115 over a wireless interface. For example, wireless device 110A may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell. In some embodiments, wireless devices 110 may have D2D capability. Thus, wireless devices 110 may be able to receive signals from and/or transmit signals directly to another wireless device 110. For example, wireless device 110A may be able to receive signals from and/or transmit signals to wireless device 110B.

In certain embodiments, network nodes 115 may interface with a radio network controller (such as the example radio network controller discussed below with regard to FIG. 14). The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 110. Wireless devices 110 may exchange certain signals with the core network node using the non-access stratum layer. In non-access stratum signaling, signals between wireless devices 110 and the core network node may be transparently passed through the radio access network. In certain embodiments, network nodes 115 may interface with one or more network nodes over an internode interface. For example, network nodes 115A and 115B may interface over an X2 interface.

As described above, example embodiments of network 100 may include one or more wireless devices 110, and one or more different types of network nodes capable of communicating (directly or indirectly) with wireless devices 110. Wireless device 110 may refer to any type of wireless device communicating with a node and/or with another wireless device in a cellular or mobile communication system. Examples of wireless device 110 include a target device, a device-to-device (D2D) capable device, a machine type communication (MTC) device or other UE capable of machine-to-machine (M2M) communication, a mobile phone or other terminal, a smart phone, a PDA (Personal Digital Assistant), a portable computer (e.g., laptop, tablet), a sensor, a modem, laptop embedded equipment (LEE), laptop mounted equipment (LME), USB dongles, ProSe UE, V2V UE, V2X UE, MTC UE, eMTC UE, FeMTC UE, UE Cat 0, UE Cat M1, narrowband Internet of Things (NB-IoT) UE, UE Cat NB1, or another device that can provide wireless communication. A wireless device 110 may also be referred to as UE, a station (STA), a device, or a terminal in some embodiments. Also, in some embodiments, generic terminology, "radio network node" (or simply "network node") is used. It can be any kind of network node, which may comprise a Node B, base station (BS), multi-standard radio (MSR) radio node such as MSR BS, eNode B, gNB, MeNB, SeNB, a network node belonging to MCG or SCG, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC), MDT, test equipment, or any suitable network node. Example embodiments of wireless devices 110, network nodes 115, and other network nodes (such as radio network controller or core network node) are described in more detail with respect to FIGS. 4, 7, and 10, respectively.

Although FIG. 3 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between wireless devices or between a wireless device and another communication device (such as a landline telephone). Furthermore, although certain embodiments may be described as implemented in a New Radio (NR) network, the embodiments may be implemented in any appropriate type of telecommunication system supporting any suitable communication standards and using any suitable components and may be applicable to any LTE based systems such as MTC, eMTC, and NB-IoT. As an example, MTC UE, eMTC UE, and NB-IoT UE may also be called UE category 0, UE category M1 and UE category NB1, respectively. However, the embodiments are applicable to any radio access technology (RAT) or multi-RAT systems in which the wireless device receives and/or transmits signals (e.g., data). For example, the various embodiments described herein may also be applicable to, LTE-Advanced, and LTE-U UMTS, LTE FDD/TDD, WCDMA/HSPA. GSM/GERAN, WiFi, WLAN, cdma2000, WiMax, 5G, another suitable radio access technology, or any suitable combination of one or more radio access technologies. It is noted that 5G, the fifth generation of mobile telecommunications and wireless technology is not yet fully defined but in an advanced draft stage with 3GPP. It includes work on 5G New Radio (NR) Access Technology. LTE terminology is used herein in a forward-looking sense, to include equivalent 5G entities or functionalities although a different term may be specified in 5G. A general description of the agreements on 5G NR Access Technology is contained in most recent versions of the 3GPP 38-series Technical Reports. Although certain embodiments may be described in the context of wireless transmissions in the downlink, the present disclosure contemplates that the various embodiments are equally applicable in the uplink and vice versa. The described techniques are generally applicable for transmissions from both network nodes 115 and wireless devices 110.

Figure 4:
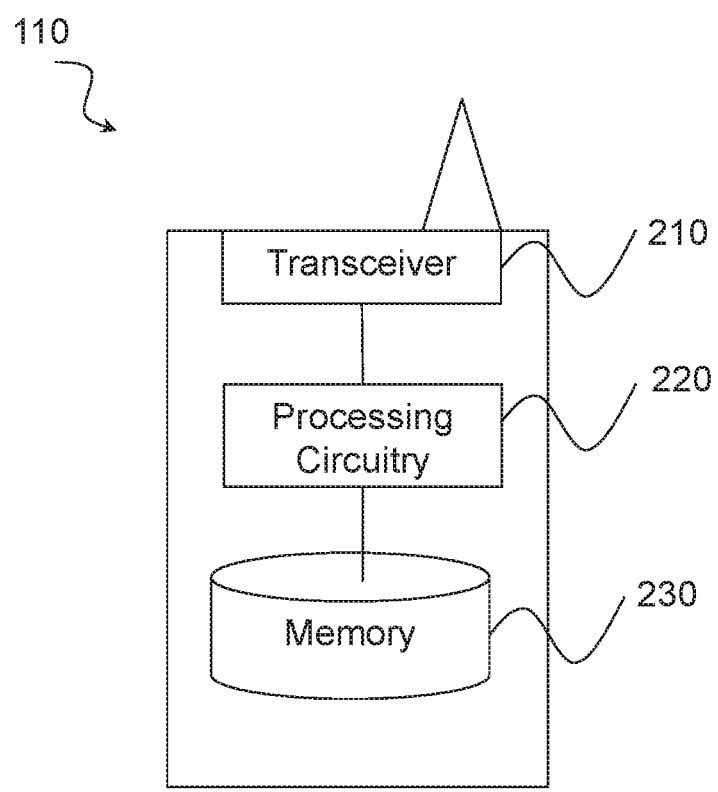
FIG. 4 illustrates an example wireless device for handling DRB integrity protection failure in NR, according to certain embodiments.

FIG. 4 illustrates an example wireless device 110 for handling DRB integrity protection failure in NR, in accordance with certain embodiments. As depicted, wireless device 110 includes transceiver 210, processing circuitry 220, and memory 230. In some embodiments, transceiver 210 facilitates transmitting wireless signals to and receiving wireless signals from network node 115 (e.g., via an antenna), processing circuitry 220 executes instructions to provide some or all of the functionality described above as being provided by wireless device 110, and memory 230 stores the instructions executed by processing circuitry 220. Examples of a wireless device 110 are provided above.

Processing circuitry 220 may include any suitable combination of hardware and software implemented in one or more modules to execute instructions and manipulate data to perform some or all of the described functions of wireless device 110. In some embodiments, processing circuitry 220 may include, for example, one or more computers, one or more central processing units (CPUs), one or more processors, one or more microprocessors, one or more applications, and/or other logic.

Memory 230 is generally operable to store instructions, such as a computer program, software, an application including one or more of logic, rules, algorithms, code, tables, etc. and/or other instructions capable of being executed by processing circuitry. Examples of memory 230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 4 that may be responsible for providing certain aspects of the wireless device's functionality, including any of the functionality described above and/or any additional functionality (including any functionality necessary to support the solution described herein).

According to certain embodiments, upon detecting integrity check failure (as described in 2.1.3), wireless device 110 may discard the PDCP data PDU without performing header decompression and without delivering the PDCP SDU to higher layers. According to certain embodiments, wireless device 110 may also send an indication to the network, informing the network of the failed integrity check. In a particular embodiment, wireless device 110 may send the indication to network node 115.

According to certain embodiments, the indication may be or comprise one of following:
RRC control message
PDCP control PDU
MAC Control Element According to certain embodiments, the indication may include one or more of the following information (in part or in full):
Bearer ID for which the integrity protection failed
UE Id (for connected mode wireless devices, this may be implicitly known from the connection)
DL COUNT for the packet for which the integrity protection check failed
Message Authentication Code received in the packet for which the integrity protection check failed
Message Authentication Code that the UE calculated for the packet for which the integrity protection check failed
The entire PDCP PDU, for which the integrity protection failed If a COUNT de-sync has occurred, all subsequent integrity verification checks will fail. As such, if wireless device 110 has reported an integrity check failure as above and the next packet passes an integrity verification check, this is probably an indication that the problem was caused by a man in the middle injecting packets. Wireless device 110 could, thus, report this as well to the network (i.e. indicated also a successful integrity verification after a previous integrity check failure), according to certain embodiments. In an alternative embodiment, wireless device 110 may trigger RRC connection re-establishment upon detection of integrity check failure.

Figure 5:
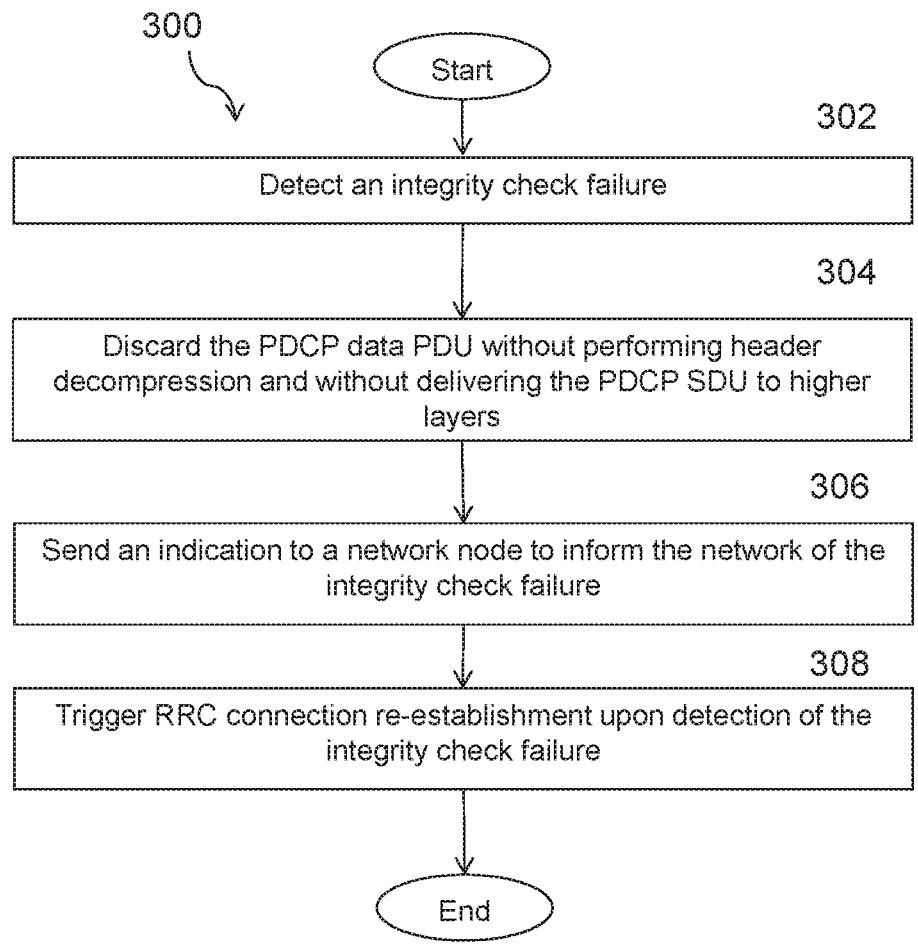
FIG. 5 illustrates an example method by a wireless device for handling DRB integrity protection failure in NR, according to certain embodiments.

FIG. 5 illustrates an example method by a wireless device 110 for handling DRB integrity protection failure in NR, according to certain embodiments. The method may begin at step 302 when wireless device 110 detects an integrity check failure. The integrity check failure may be detected as discussed in 2.1.3 and as described above.

At step 304, wireless device 110 discards the PDCP data PDU without performing header decompression and without delivering the PDCP SDU to higher layers.

At step 306, wireless device 110 sends an indication to network node 115. According to certain embodiments, the indication may inform network node 115 of the failed integrity check. In particular embodiments, the indication may comprise a RRC control message, a PDCP control PDU, a MAC Control Element. In particular embodiments, the indication may include one or more of the following (in part or in full): Bearer ID for which the integrity protection failed, a wireless device identifier (UE Id) (for a connected mode wireless device, this may be implicitly known from the connection), DL COUNT for a packet for which the integrity protection check failed, Message Authentication Code received in the packet for which the integrity protection check failed, and/or the entire PDCP PDU, for which the integrity protection failed.

At step 308, wireless device 110 may trigger RRC connection re-establishment upon detection of the integrity check failure.

Figure 6:
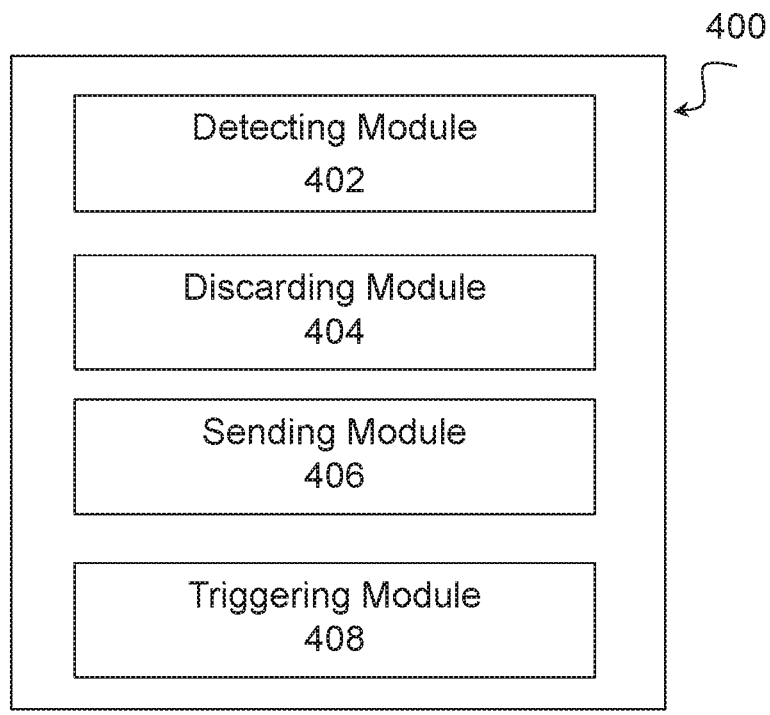
FIG. 6 illustrates an example virtual computing device for handling DRB integrity protection failure in NR, according to certain embodiments.

In certain embodiments, the method for handling DRB integrity protection failure in NR as described above may be performed by a virtual computing device. FIG. 6 illustrates an example virtual computing device 400 for handling DRB integrity protection failure in NR, according to certain embodiments. In certain embodiments, virtual computing device 400 may include modules for performing steps similar to those described above with regard to the method illustrated and described in FIG. 3. For example, virtual computing device 400 may include a detecting module 402, a discarding module 404, a sending module 406, a triggering module 408, and any other suitable modules for handling DRB integrity protection failure in NR. In some embodiments, one or more of the modules may be implemented using processing circuitry 220 of FIG. 4. In certain embodiments, the functions of two or more of the various modules may be combined into a single module.

The detecting module 402 may perform certain or all of the detecting functions of virtual computing device 400. For example, in a particular embodiment, detecting module 402 may detect an integrity check failure. The integrity check failure may be detected as discussed in 2.1.3 and as described above.

The discarding module 404 may perform certain or all of the discarding functions of virtual computing device 400. For example, in a particular embodiment, discarding module 404 may discard the PDCP data PDU without performing header decompression and without delivering the PDCP SDU to higher layers.

The sending module 406 may perform certain or all of the sending functions of virtual computing device 400. For example, in a particular embodiment, sending module 406 may send an indication to network node 115 to inform network node 115 of the failed integrity check.

The triggering module 408 may perform certain or all of the triggering functions of virtual computing device 400. For example, in a particular embodiment, triggering module 408 may trigger RRC connection re-establishment upon detection of the integrity check failure.

Other embodiments of virtual computing device 400 may include additional components beyond those shown in FIG. 6 that may be responsible for providing certain aspects of the wireless device's 110 functionality, including any of the functionality described above and/or any additional functionality (including any functionality necessary to support the solutions described above). The various different types of wireless devices 110 may include components having the same physical hardware but configured (e.g., via programming) to support different radio access technologies, or may represent partly or entirely different physical components.

Figure 7:
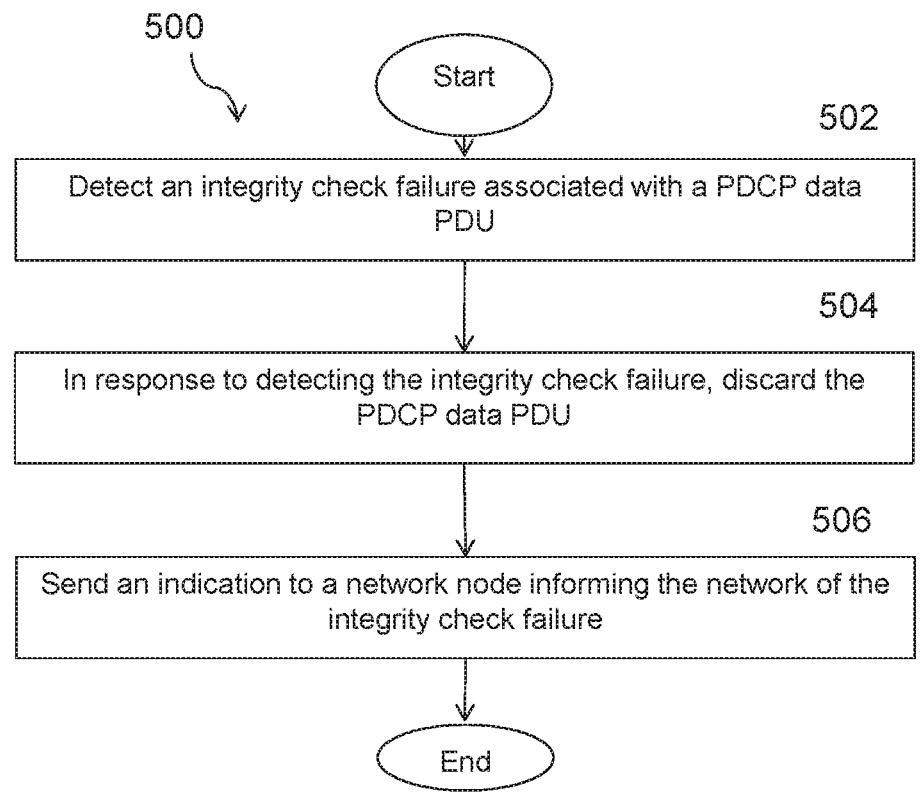
FIG. 7 illustrates another example method by a wireless device for handling DRB integrity protection failure in NR, according to certain embodiments.

FIG. 7 illustrates another example method by a wireless device 100 for handling DRB integrity protection failure in NR, according to certain embodiments. In a particular embodiment, the wireless device 110 may include a UE.

The method begins at step 502 when wireless device 110 detects an integrity check failure associated with a PDCP data PDU.

At step 504, wireless device 110 discards the PDCP data PDU in response to detecting the integrity check failure.

At step 506, wireless device 110 sends an indication to a network node 115. The indication informs network node 115 of the integrity check failure. In a particular embodiment, the indication may include an RRC control message, the PDCP control PDU, and/or a MAC Control Element. In a particular embodiment, the indication may include information that includes one or more of the following: Bearer ID for the PDCP data PDU associated with the integrity check failure; DL COUNT for the PDCP data PDU associated with the integrity check failure; Message Authentication Code-Integrity (MAC-I) received in the PDCP data PDU associated with the integrity check failure; and/or the PDCP data PDU associated with the integrity check failure.

In a particular embodiment, the method may further include detecting an integrity check success after detecting the integrity check failure and sending an indication to the network node identifying the integrity check success.

Figure 8:
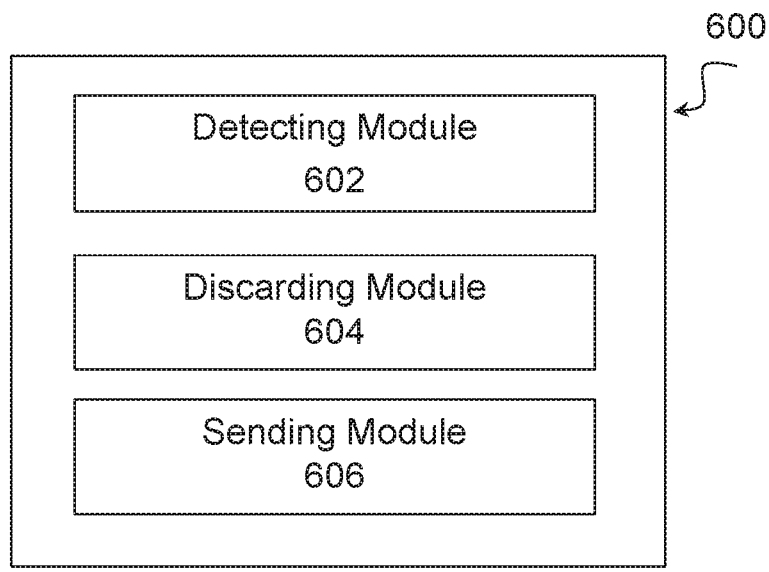
FIG. 8 illustrates another example virtual computing device for handling DRB integrity protection failure in NR, according to certain embodiments.

In certain embodiments, the method for handling DRB integrity protection failure in NR as described above may be performed by a virtual computing device. FIG. 8 illustrates another example virtual computing device 600 for handling DRB integrity protection failure in NR, according to certain embodiments. In certain embodiments, virtual computing device 600 may include modules for performing steps similar to those described above with regard to the method illustrated and described in FIG. 7. For example, virtual computing device 600 may include a detecting module 602, a discarding module 604, a sending module 606, and any other suitable modules for handling DRB integrity protection failure in NR. In some embodiments, one or more of the modules may be implemented using processing circuitry 220 of FIG. 4. In certain embodiments, the functions of two or more of the various modules may be combined into a single module.

The detecting module 602 may perform certain or all of the detecting functions of virtual computing device 600. For example, in a particular embodiment, detecting module 602 may detect an integrity check failure associated with a PDCP data PDU. The integrity check failure may be detected as discussed in 2.1.3 and as described above, in a particular embodiment.

The discarding module 604 may perform certain or all of the discarding functions of virtual computing device 600. For example, in a particular embodiment, discarding module 604 may discard the PDCP data PDU in response to detecting the integrity check failure.

The sending module 606 may perform certain or all of the sending functions of virtual computing device 600. For example, in a particular embodiment, sending module 606 may send an indication to network node 115 to inform network node 115 of the failed integrity check.

Other embodiments of virtual computing device 600) may include additional components beyond those shown in FIG. 8 that may be responsible for providing certain aspects of the wireless device's 110 functionality, including any of the functionality described above and/or any additional functionality (including any functionality necessary to support the solutions described above). The various different types of wireless devices 110 may include components having the same physical hardware but configured (e.g., via programming) to support different radio access technologies, or may represent partly or entirely different physical components.

Figure 9:
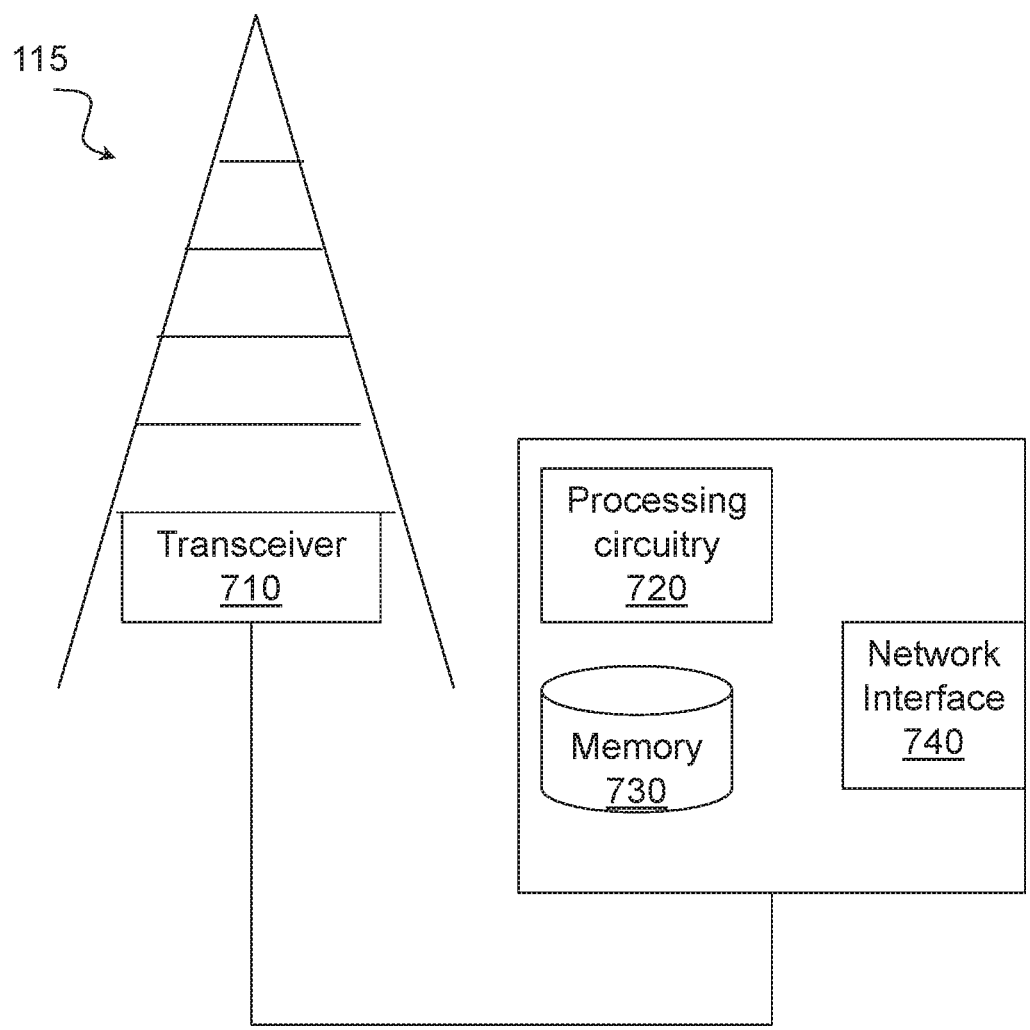
FIG. 9 illustrate an example network node for handling DRB integrity protection failure in NR, according to certain embodiments.

FIG. 9 illustrate an example network node 115 for handling DRB integrity protection failure in NR, according to certain embodiments. As described above, network node 115 may be any type of radio network node or any network node that communicates with a wireless device and/or with another network node. Examples of a network node 115 are provided above.

Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 710, processing circuitry 720, memory 730, and network interface 740. In some embodiments, transceiver 710 facilitates transmitting wireless signals to and receiving wireless signals from wireless device 110 (e.g., via an antenna), processing circuitry 720 executes instructions to provide some or all of the functionality described above as being provided by a network node 115, memory 730 stores the instructions executed by processing circuitry 720, and network interface 740 communicates signals to backend network components, such as a gateway, switch, router, Internet, Public Switched Telephone Network (PSTN), core network nodes or radio network controllers, etc.

In certain embodiments, network node 115 may be capable of using multi-antenna techniques and may be equipped with multiple antennas and capable of supporting MIMO techniques. The one or more antennas may have controllable polarization. In other words, each element may have two co-located sub elements with different polarizations (e.g., 90-degree separation as in cross-polarization), so that different sets of beamforming weights will give the emitted wave different polarization.

Processing circuitry 720 may include any suitable combination of hardware and software implemented in one or more modules to execute instructions and manipulate data to perform some or all of the described functions of network node 115. In some embodiments, processing circuitry 720 may include, for example, one or more computers, one or more central processing units (CPUs), one or more microprocessors, one or more applications, and/or other logic.

Memory 730 is generally operable to store instructions, such as a computer program, software, an application including one or more of logic, rules, algorithms, code, tables, etc. and/or other instructions capable of being executed by a processor. Examples of memory 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 740 is communicatively coupled to processing circuitry 720 and may refer to any suitable device operable to receive input for network node 115, send output from network node 115, perform suitable processing of the input or output or both, communicate to other devices, or any combination of the preceding. Network interface 740 may include appropriate hardware (e.g., port, modem, network interface card, etc.) and software, including protocol conversion and data processing capabilities, to communicate through a network.

Other embodiments of network node 115 may include additional components beyond those shown in FIG. 9 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components. Additionally, the terms first and second are provided for example purposes only and may be interchanged.

When the network receives the indication of failed integrity check from a wireless device 110, the network may check the Down Link (DL) COUNT value received from the wireless device 110 and compare it with its own local DL COUNT value associated with the bearer ID included in the received integrity check failure indication. According to certain embodiments, network node 115 may have sent a few PDCP packets in the downlink after wireless device 110 transmitted the error notification. As such, network node 115 has then increased its DL COUNT and will almost surely receive a smaller DL COUNT from wireless device 110 for the failing packet.

There is a need to have an allowed skew between the network node's 115 current value of the DL COUNT and what the network node 115 received from wireless device 100. Unfortunately, there is no notion of a transmission window in PDCP. However, according to certain embodiments, the check can be achieved with the following steps:

eNB stores MAC-I and DL COUNT for the N last transmitted PDCP PDUs.
 eNB gets an indication from UE of MAC-I failure for a PDCP PDU with DL COUNT=m.
 The eNB checks the received DL COUNT if it matches with one of the stored N DL COUNTS
 If there is a match, it indicates that the DL COUNT is correct, and the integrity protection failure could be caused by the following causes:
  there was one or more bit-errors in the PDCP packet
 If there is no match, it indicates that there is a mismatch between the DL COUNT in network and wireless device 110, which can be caused by one of the following causes:
  COUNT is desynchronized due to protocol error or poor radio
  An attacker has injected packets to the system Normal PDCP implementation keeps the PDCP PDUs at the transmitter buffer until the RLC ACKs corresponding to the PDCP PDU are received. If the PDCP implementation is storing the whole PDU (i.e. encrypted PDCP SDU+MAC-I) in the PDCP buffer until they are ACKed, then what is required additionally for the sake of this invention is to store the COUNT value along that as well. However, the RLC ACKs for a PDCP PDU might be received at network node 115 before the integrity check error corresponding to that PDCP PDU has been received (i.e. as the PDCP at wireless device 110 has to detect integrity check error, send the indication, and indication has to be received at network node 115), it could happen that the network node 115 may have already removed the stored PDCP PDU when the indication is received. In one alternative, the PDCP might keep the stored PDCP PDUs in its transmit buffer for a certain duration even after the PDU has been ACKed at the RLC level to mitigate this problem. In another implementation, a similar approach to the above can be used where the PDCP keeps the last X PDCP PDUs even after they are ACKed.

As discussed above, wireless device 110 may indicate a successful integrity check after a previous integrity check failure. When network node 115 receives such a message, network node 115 will know the problem is not with the COUNT de-sync but most probably packets being injected by an intruder. Thus, network node 115 will know that network node 115 is not required to release/re-establish/handover the connection.

The procedure is not guaranteed to be correct but will behave well in practice. For example, if there is a bit error in the SN part of the PDCP header in such a way that it creates a COUNT value not in the network node's list, then the procedure will incorrectly deduce that the COUNT is out of synch. This will however only result in network node 115 deciding to recover by one of the mechanism below even though it may not be needed. It hence just causes an unnecessary recovery.

Possible network actions may be different depending on the cause detected for the integrity protection failure. Thus, where there is a match (i.e., indicating that the DL count is correct and the integrity protection failure may have been caused by one or more bit-errors in the PDCP packet), the network may decide to do nothing, as it is only a temporary fault. Where there is no match because the COUNT is desynchronized due to protocol error or poor radio or because an attacker has injected packets to the system, the user plane will not recover as network and UE PDCP COUNTs are not aligned and deciphering will not succeed and create corrupt packets to higher layers. Therefore, according to certain embodiments, correct network action may be one of following:

Release the UE connection

Trigger intra cell handover procedure, in which all security keys are updated, and COUNT is reset in both UE and network.

Figure 10:
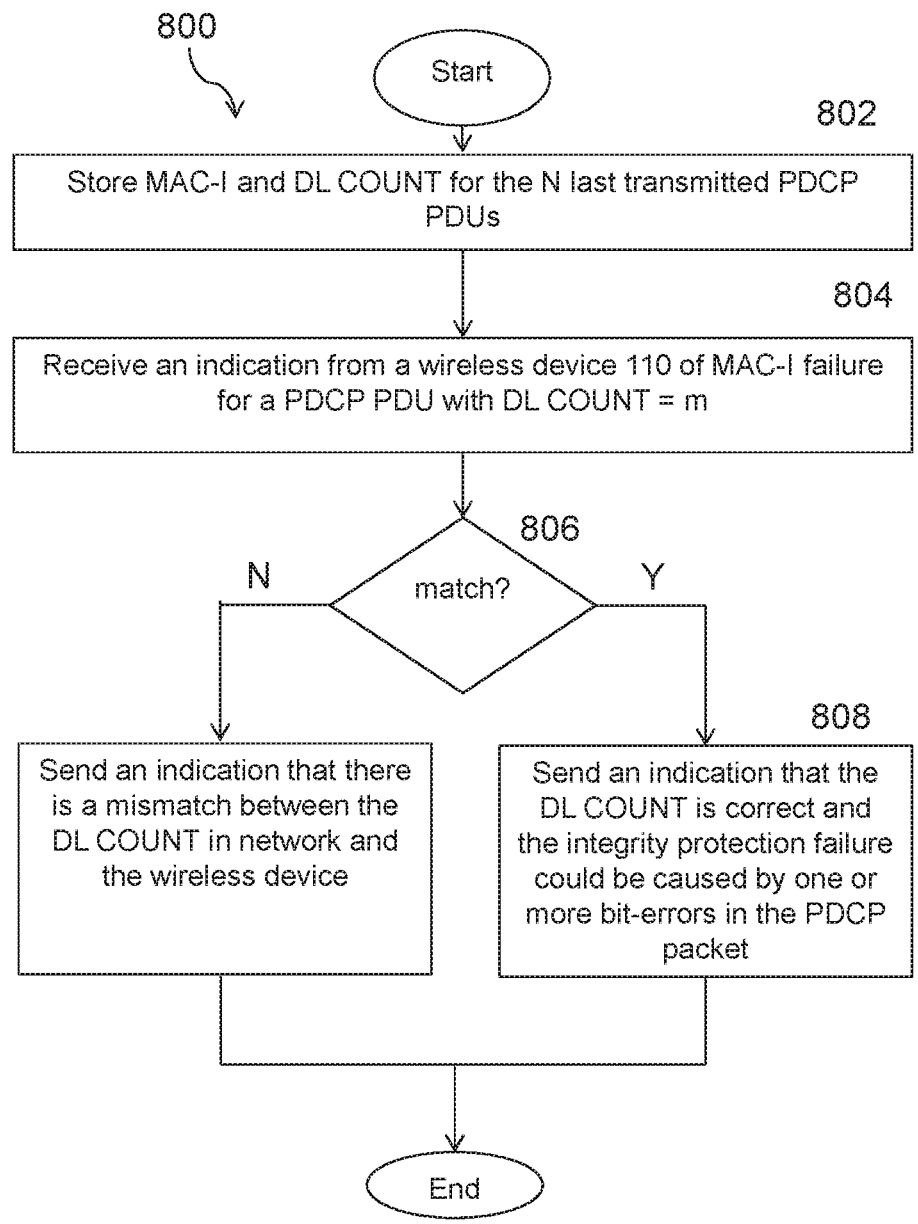
FIG. 10 illustrates an example method by a network node for handling DRB integrity protection failure in NR, according to certain embodiments.

FIG. 10 illustrates an example method 800 by a network node 115 for handling DRB integrity protection failure in NR, according to certain embodiments. The method begins at step 802 when network node 115 stores MAC-I and DL COUNT for the N last transmitted PDCP PDUs.

At step 804, network node 115 receives an indication from a wireless device 110 of MAC-I failure for a PDCP PDU with DL COUNT=m. Network node 115 determines whether the received DL COUNT matches one of the stored N DL COUNTS at step 806.

If the received DL COUNT matches one of the stored N DL COUNTS, the method continues to step 808 and network node 115 sends an indication that the DL COUNT is correct, and the integrity protection failure could be caused by one or more bit-errors in the PDCP packet.

If the received DL COUNT does not match one of the stored N DL COUNTS at step 806, the method continues instead to step 810 and network node 115 sends an indication that there is a mismatch between the DL COUNT in network and the wireless device.

Figure 11:
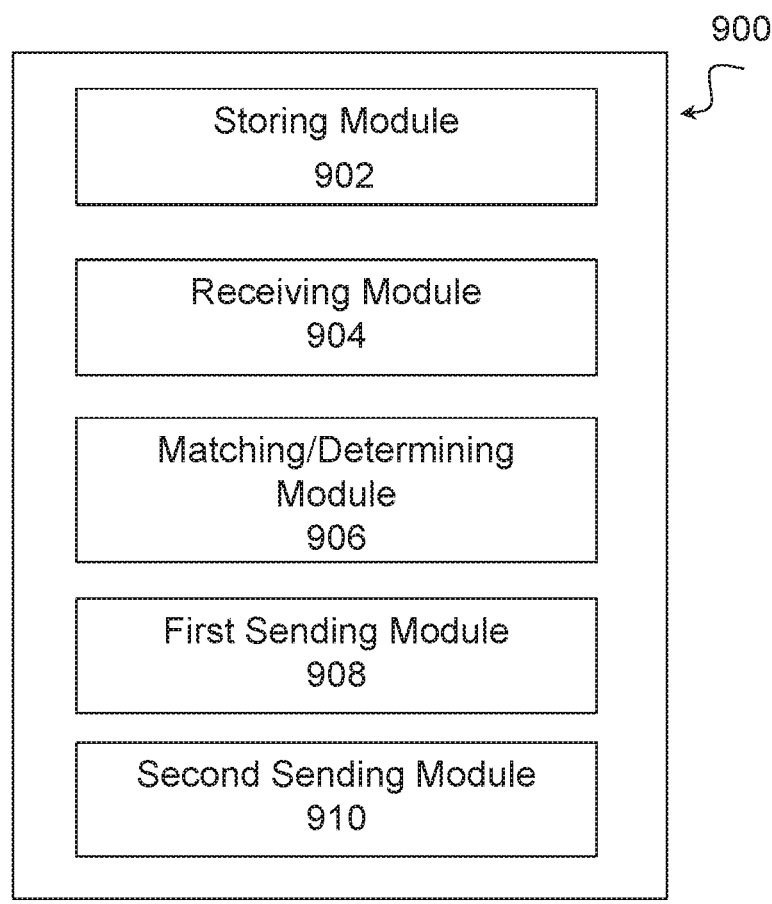
FIG. 11 illustrates another example virtual computing device for handling DRB integrity protection failure in NR, according to certain embodiments.

In certain embodiments, the method for handling DRB integrity protection failure in NR as described above may be performed by a virtual computing device. FIG. 11 illustrates an example virtual computing device 900 for handling DRB integrity protection failure in NR, according to certain embodiments. In certain embodiments, virtual computing device 900 may include modules for performing steps similar to those described above with regard to the method illustrated and described in FIG. 10. For example, virtual computing device 900 may include a storing module 902, a receiving module 904, a matching/determining module 906, a first sending module 908, a second sending module 910, and any other suitable modules for handling DRB integrity protection failure in NR. In some embodiments, one or more of the modules may be implemented using processing circuitry 720 of FIG. 9. In certain embodiments, the functions of two or more of the various modules may be combined into a single module.

The storing module 902 may perform certain or all of the storing functions of virtual computing device 900. For example, in a particular embodiment, storing module 902 may store MAC-I and DL COUNT for the N last transmitted PDCP PDUs.

The receiving module 904 may perform certain or all of the receiving functions of virtual computing device 900. For example, in a particular embodiment, receiving module 904 may receive an indication from a wireless device 110 of MAC-I failure for a PDCP PDU with DL COUNT=m.

The matching/determining module 906 may perform certain or all of the matching and determining functions of virtual computing device 900. For example, in a particular embodiment, matching/determining module 906 may determine whether the received DL COUNT matches one of the stored N DL COUNTS.

The first sending module 908 may perform certain or all of the sending functions of virtual computing device 900. For example, in a particular embodiment, first sending module 908 may send an indication that the DL COUNT is correct if the received DL COUNT was determined to match one of the stored N DL COUNTS.

The second sending module 910 may perform certain or all of the sending functions of virtual computing device 900. For example, in a particular embodiment, second sending module 908 may send an indication that there is a mismatch between the DL COUNT in network and the wireless device if the received DL COUNT was determined not to match one of the stored N DL COUNTS.

Other embodiments of virtual computing device 900 may include additional components beyond those shown in FIG. 9 that may be responsible for providing certain aspects of the network node's functionality, including any of the functionality described above and/or any additional functionality (including any functionality necessary to support the solutions described above). Other embodiments may include fewer embodiments. For example, the functions of the first sending module 908 and the second sending module 910 may be combined into a single sending module. The various different types of network node 115 may include components having the same physical hardware but configured (e.g., via programming) to support different radio access technologies, or may represent partly or entirely different physical components.

Figure 12:
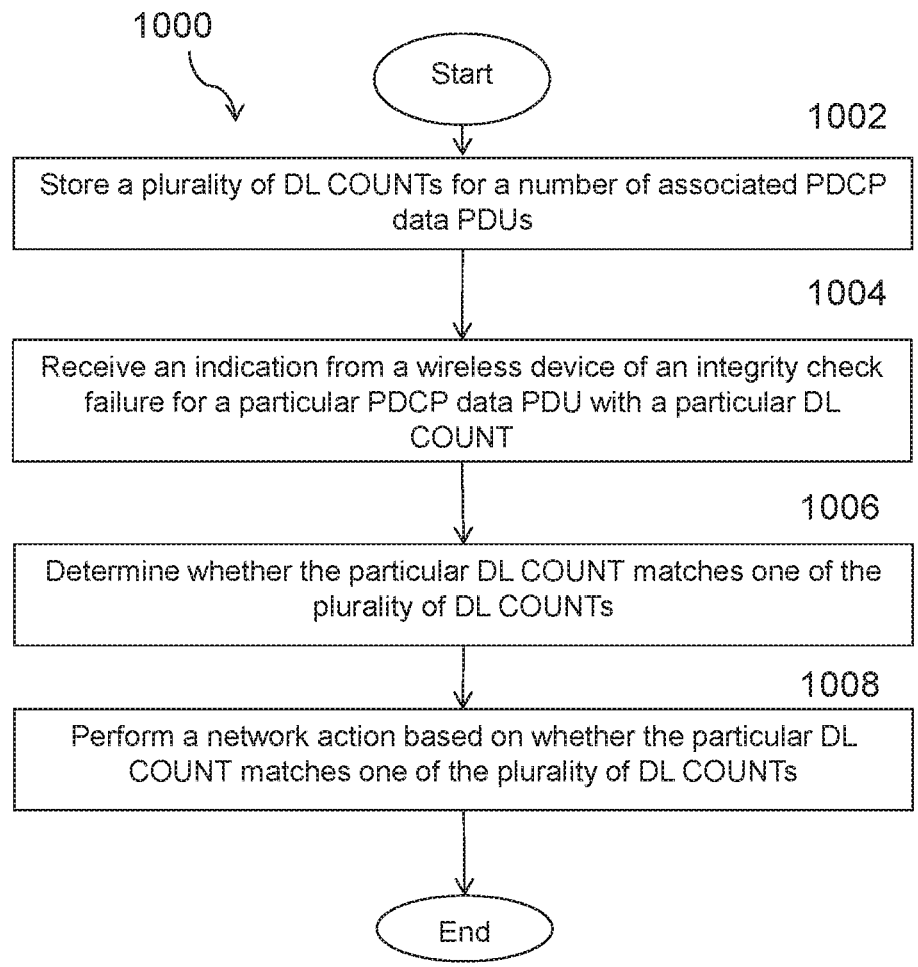
FIG. 12 illustrates another example method by a network node for handling DRB integrity protection failure in NR, according to certain embodiments.

FIG. 12 illustrates another example method 1000 by a network node 115 for handling DRB integrity protection failure in NR, according to certain embodiments. In particular embodiments, the network node 115 may include an eNB or a gNB.

The method begins at step 1002 when the network node 115 stores a plurality of DL COUNTs for a number of associated PDCP data PDUs. In a particular embodiment, the network node 115 may also store an associated MAC-I with each of the plurality of DL COUNTs for the number of associated PDCP data PDUs.

At step 1004, network node 115 receives an indication from a wireless device of an integrity check failure for a particular PDCP data PDU with a particular DL COUNT. In a particular embodiment, the indication comprises information that includes one or more of the following: a Bearer ID for the PDCP data PDU associated with the integrity check failure; the particular DL COUNT for the particular PDCP data PDU associated with the integrity check failure; a MAC-I received in the particular PDCP data PDU associated with the integrity check failure; and the particular PDCP data PDU associated with the integrity check failure.

At step 1006, network node 115 determines whether the particular DL COUNT matches one of the plurality of DL COUNTS. A network action is then performed, at step 1008, based on whether the particular DL COUNT matches one of the plurality of DL COUNTs.

For example, in particular embodiments, it may be determined that the DL COUNT matches one of the plurality of DL counts, and the network action may include sending an indication that the DL COUNT is correct to indicate that the integrity protection failure is temporary. Alternatively, the network node 115 may decide to take no action (i.e., do nothing) since the integrity protection failure is temporary.

In another particular embodiment, for example, it may be determined that the DL COUNT does not match one of the plurality of DL counts, and the network action may send an indication that there is a mismatch between a DL count in network node 115 and the wireless device 110. In another embodiment, in case of mismatch, network node 115 may determine that the integrity check failure is because the COUNT is desynchronized. Network node 115 may release a connection between network node 115 and wireless device 110 or trigger an intra cell handover procedure.

In a particular embodiment, the method may further include storing each of the plurality of DL COUNTs along with a copy of a respective one of the PDCP data PDUs in a PDCP buffer for a duration of time after the respective one of the PDCDP PDUs has been acknowledged by the wireless device.

In a particular embodiment, the method may further include the network node 115 receiving a successful integrity check after the integrity check failure and determining that the integrity check failure is a result of one or more packets being injected in the particular PDCP data PDU by an intruder. Network node 116 may then determine to that the connection between network node 115 and the wireless device 110 need not be reestablished, released, or handed over.

Figure 13:
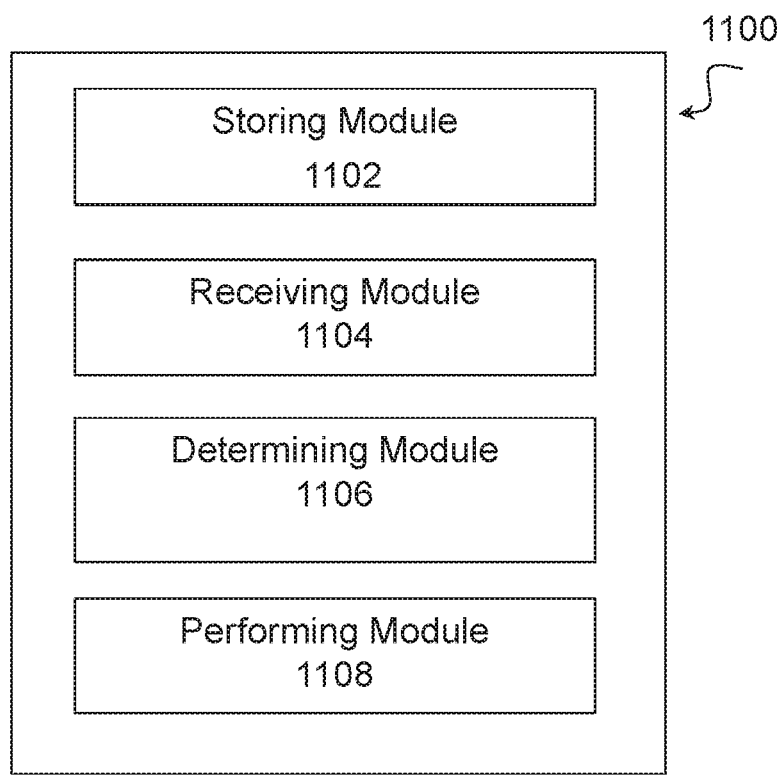
FIG. 13 illustrates another example virtual computing device for handling DRB integrity protection failure in NWR according to certain embodiments.

In certain embodiments, the method for handling DRB integrity protection failure in NR as described above may be performed by a virtual computing device. FIG. 13 illustrates another example virtual computing device 1100 for handling DRB integrity protection failure in NR, according to certain embodiments. In certain embodiments, virtual computing device 1100 may include modules for performing steps similar to those described above with regard to the method illustrated and described in FIG. 12. For example, virtual computing device 1100 may include a storing module 1102, a receiving module 1104, a determining module 1106, a performing module 1108, and any other suitable modules for handling DRB integrity protection failure in NR. In some embodiments, one or more of the modules may be implemented using processing circuitry 720 of FIG. 9. In certain embodiments, the functions of two or more of the various modules may be combined into a single module.

The storing module 1102 may perform certain or all of the storing functions of virtual computing device 1100. For example, in a particular embodiment, storing module 1102 may store a plurality of DL COUNTs for a number of associated PDCP data PDUs.

The receiving module 1104 may perform certain or all of the receiving functions of virtual computing device 1100. For example, in a particular embodiment, receiving module 1104 may receive an indication from wireless device 110 of an integrity check failure for a particular PDCP data PDU with a particular DL COUNT.

The determining module 1106 may perform certain or all of the determining functions of virtual computing device 1100. For example, in a particular embodiment, determining module 1106 may determine whether the particular DL COUNT matches one of the plurality of DL COUNTs.

The performing module 1108 may perform certain or all of the performing functions of virtual computing device 1100. For example, in a particular embodiment, performing module 1108 may perform a network action based on whether the particular DL COUNT matches one of the plurality of DL COUNTs.

Other embodiments of virtual computing device 1100 may include additional components beyond those shown in FIG. 13 that may be responsible for providing certain aspects of the network node's functionality, including any of the functionality described above and/or any additional functionality (including any functionality necessary to support the solutions described above). Other embodiments may include fewer modules. The various different types of network node 115 may include components having the same physical hardware but configured (e.g., via programming) to support different radio access technologies, or may represent partly or entirely different physical components.

Figure 14:
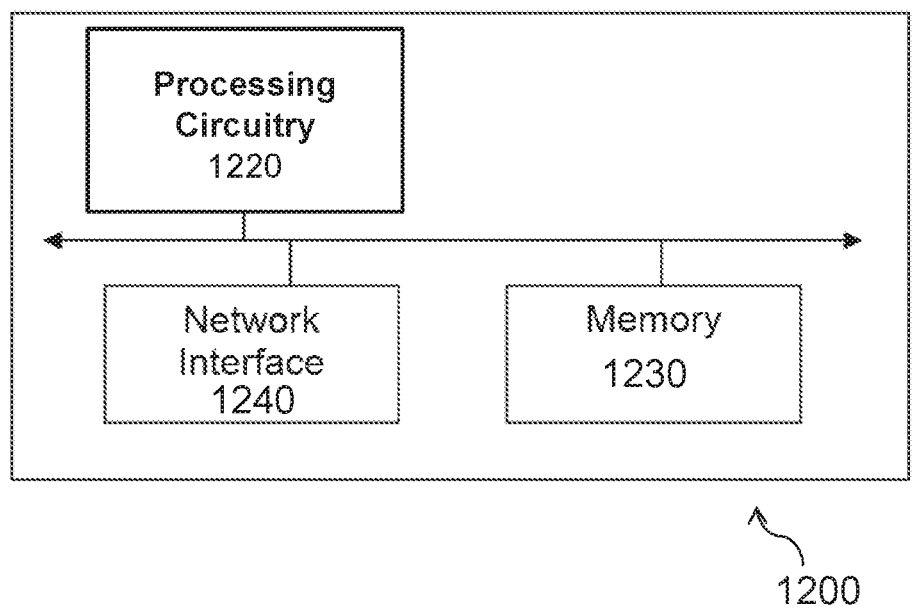
FIG. 14 illustrates an exemplary radio network controller or core network node, according to certain embodiments.

FIG. 14 illustrates an exemplary radio network controller or core network node, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 1200 includes processing circuitry 1220, memory 1230, and network interface 1240. In some embodiments, processing circuitry 1220 executes instructions to provide some or all of the functionality described above as being provided by the network node, memory 1230 stores the instructions executed by processing circuitry 1220, and network interface 1240 communicates signals to any suitable node, such as a gateway, switch, router, Internet, Public Switched Telephone Network (PSTN), network nodes 115, radio network controllers or core network nodes 1200, etc.

Processing circuitry 1220 may include any suitable combination of hardware and software implemented in one or more modules to execute instructions and manipulate data to perform some or all of the described functions of the radio network controller or core network node 1200. In some embodiments, processing circuitry 1220 may include, for example, one or more computers, one or more central processing units (CPUs), one or more microprocessors, one or more applications, and/or other logic.

Memory 1230 is generally operable to store instructions, such as a computer program, software, an application including one or more of logic, rules, algorithms, code, tables, etc. and/or other instructions capable of being executed by a processor. Examples of memory 1230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1240 is communicatively coupled to processing circuitry 1220 and may refer to any suitable device operable to receive input for the network node, send output from the network node, perform suitable processing of the input or output or both, communicate to other devices, or any combination of the preceding. Network interface 1240 may include appropriate hardware (e.g., port, modem, network interface card, etc.) and software, including protocol conversion and data processing capabilities, to communicate through a network.

Other embodiments of the network node may include additional components beyond those shown in FIG. 14 that may be responsible for providing certain aspects of the network node's functionality, including any of the functionality described above and/or any additional functionality (including any functionality necessary to support the solution described above).

According to certain embodiments, a method in a wireless device may include detecting integrity check failure, in response to detecting the integrity check failure, discarding the PDCP data PDU without performing header decompression and without delivering the PDCP SDU to higher layers, and sending an indication to a network node, the indication informing the network node of the failed integrity check.

Optionally, the indication comprises one of following: RRC control message, PDCP control PDU, and MAC Control Element.

Optionally, the indication comprises information that includes one or more of the following (in part or in full):

Bearer ID for which the integrity protection failed, a wireless device identifier (UE Id) (for a connected mode wireless device, this may be implicitly known from the connection), DL COUNT for a packet for which the integrity protection check failed, Message Authentication Code received in the packet for which the integrity protection check failed, and the entire PDCP PDU, for which the integrity protection failed.

Optionally, the method further includes detecting an integrity check success after detecting the integrity check failure and sending an indication to the network node identifying the integrity check success.

Optionally, the method further includes triggering RRC connection re-establishment upon detection of the integrity check failure.

According to certain embodiments, a wireless device may include processing circuitry, the processing circuitry configured to detect integrity check failure, in response to detecting the integrity check failure, discard the PDCP data PDU without performing header decompression and without delivering the PDCP SDU to higher layers, and send an indication to a network node, the indication informing the network node of the failed integrity check.

Optionally, the indication comprises one of following: RRC control message, PDCP control PDU, and MAC Control Element.

Optionally, the indication comprises information that includes one or more of the following (in part or in full): Bearer ID for which the integrity protection failed, a wireless device identifier (UE Id) (for a connected mode wireless device, this may be implicitly known from the connection), DL COUNT for a packet for which the integrity protection check failed, Message Authentication Code received in the packet for which the integrity protection check failed, and the entire PDCP PDU, for which the integrity protection failed.

Optionally, the processing circuitry may be further configured to: detect an integrity check success after detecting the integrity check failure; and send an indication to the network node identifying the integrity check success.

Optionally, the processing circuitry may be further configured to trigger RRC connection re-establishment upon detection of the integrity check failure.

According to certain embodiments, method in a network node may include storing MAC-I and DL COUNT for the N last transmitted PDCP PDUs, receiving an indication from a wireless device of MAC-I failure for a PDCP PDU with DL COUNT=m, determining whether the received DL COUNT matches one of the stored N DL COUNTS, if the received DL COUNT matches one of the stored N DL COUNTS, sending an indication that the DL COUNT is correct and the integrity protection failure could be caused by one or more bit-errors in the PDCP packet, if the received DL COUNT does not match one of the stored N DL COUNTS, sending and indication that there is a mismatch between the DL COUNT in network and the wireless device.

Optionally, the method further includes storing the COUNT value along with the whole PDU (i.e., encrypted PDCP SDU+MAC-I) in a PDCP buffer for a duration even after the PDU has been acknowledged by the network node.

Optionally, the method further includes storing a predetermined number of PDCP PDUs in a PDCP buffer even after the PDUs have been acknowledged by the network node.

Optionally, the method further includes receiving a successful integrity check after the integrity check failure and determining that the integrity check failure is likely the result of packets being injected by an intruder, determining that reestablishment of the connection, release of the connection, and handover of the connection is not necessary.

Optionally, the method further includes if the received DL COUNT matches one of the stored N DL COUNTS deciding to do nothing, as it is only a temporary fault, and if the received DL COUNT does not match because the COUNT is desynchronized due to protocol error or poor radio or because an attacker has injected packets to the system, perform one of the following: release the UE connection; or trigger intra cell handover procedure, in which all security keys are updated, and COUNT is reset in both the wireless device and the network node.

According to certain embodiments, a network node may include processing circuitry, the processing circuitry configured to store MAC-I and DL COUNT for the N last transmitted PDCP PDUs, receive an indication from a wireless device of MAC-I failure for a PDCP PDU with DL COUNT=m, determine whether the received DL COUNT matches one of the stored N DL COUNTS, if the received DL COUNT matches one of the stored N DL COUNTS send an indication that the DL COUNT is correct and the integrity protection failure could be caused by one or more bit-errors in the PDCP packet, and if the received DL COUNT does not match one of the stored N DL COUNTS send and indication that there is a mismatch between the DL COUNT in network and the wireless device.

Optionally, the processing circuitry may be further configured to store the COUNT value along with the whole PDU (i.e., encrypted PDCP SDU+MAC-I) in a PDCP buffer for a duration even after the PDU has been acknowledged by the network node.

Optionally, the processing circuitry may be further configured to store a predetermined number of PDCP PDUs in a PDCP buffer even after the PDUs have been acknowledged by the network node.

Optionally, the processing circuitry may be further configured to receive a successful integrity check after the integrity check failure, determine that the integrity check failure is likely the result of packets being injected by an intruder, determine that reestablishment of the connection, release of the connection, and handover of the connection is not necessary.

Optionally, the processing circuitry may be further configured to if the received DL COUNT matches one of the stored N DL COUNTS decide to do nothing, as it is only a temporary fault, and if the received DL COUNT does not match because the COUNT is desynchronized due to protocol error or poor radio or because an attacker has injected packets to the system, perform one of the following: release the UE connection or trigger intra cell handover procedure, in which all security keys are updated, and COUNT is reset in both the wireless device and the network node.

Additional information relating to the handling of DRB integrity protection failure may include:

Introduction: SA3 has discussed integrity protection for user plane in NR as a guard against man in the middle attacks in 3GPP TS 33.899, entitled the Study on the security aspects of the next generation system.

In email discussion [98#21], UE and network behaviour as a result of user plane integrity failure was discussed, with the purpose to ask SA3 for direction regarding correct UE and network behaviour upon integrity protection failure. However, it was decided to limit the questions in the LS to the case of integrity protection failure on the SRB in LS to SA3 regarding integrity protection SRB. It was further decided to continue to discuss the DRB case in RAN2, before formulating questions to SA3. In this contribution, we provide some input to this discussion.

Discussion: In Draft LS to SA3 with questions on DRB from email discussion [98#21], the following questions were drafted for the cases of integrity check failure on DRB:

RAN2 would additionally like to clarify the expected network and UE behaviour when integrity check failure is detected on any DRB, including the cases when MCG and SCG split bearers are used Q3a: What is the expected network behaviour on detection of integrity check failure on one (or more) of the DRBs?

Q3b: What is the expected UE behaviour on detection of integrity check failure on one (or more) of the DRBs? Is UE allowed to continue to transmit UL data on the other DRBs in the same cell group (e.g., other SCG and split SCG DRBs if an integrity check failure is detected on one SCG DRB)? For a split DRB, is UE allowed to send UL data over the other cell group after detection of integrity check failure on data sent over one cell group (e.g. can UE continue to send UL data over MCG part of the split bearer on detection of an integrity check failure on the data received over SCG part for this split DRB)?

Q3c: With respect to Q3b, for MCG split bearer case, would the UE behaviour be different on integrity check failure for MCG DRB and for MCG split DRB?

As a guidance towards correct UE and network behaviour for UP, we can use the case of Relay Nodes (RN), for which DRB integrity protection is already defined. In 36.331, it is mentioned that:

To provide integrity protection on DRBs between the RN and the E-UTRAN, the $K_{UPint}$ key is derived from the $K_{eNB}$ key as described in TS33.401. The same integrity protection algorithm used for SRBs also applies to the DRBs. The $K_{UPint}$ changes at every handover and RRC connection re-establishment and is based on an updated $K_{eNB}$ which is derived by taking into account the nextHopChainingCount. The COUNT value maintained for DRB ciphering is also used for integrity protection, if the integrity protection is configured for the DRB.

Applying the same structure to NR DRBs, this means that separate COUNT values will be maintained for each DRB. This means that integrity protection failure on one bearer due to injected packets will not affect transmission on other bearers, since decoding of those will not be impacted.

Integrity protection failure on one DRB will not affect integrity procedure check of another DRB Furthermore, the following text in 33.401 describes the RN behaviour upon detected integrity protection failure:

In case of Jailed integrity check (i.e. faulty or missing MAC-I) is detected after the start of integrity protection, the concerned message shall be discarded. This can happen on the DeNB side or on the RN side.

NOTE: The handling of UP integrity check failures by an RN is an implementation issue. TS 36.323 intentionally does not mandate any action for a failed integrity check (not even sending an indication of failure to higher layers). Consequently, depending on the implementation, the message failing integrity check is, or is not, silently discarded. This is in contrast to the handling of a failed RRC integrity check by a UE, cf. the NOTE in clause 7.4.1 of the present document.

For relay nodes, packets for which integrity protection fails are simply discarded.

For integrity protection failure on DRB in EN-DC, we see two possible approaches:
  1. Apply same behavior as for Relay Nodes, i.e. PDUs with failed IP checksum are deleted. No further action is needed by the UE, as according to observation 1, there is no impact from IP failure on one DRB on other DRBs.
  2. PDUs with failed IP checksum are deleted. UE then sends an indication to the network of the failed IP, so that network can take appropriate action. This could be useful for the case where integrity protection failure is caused by a mismatch in the COUNT maintained in the network and the UE. Such mismatch will cause deciphering to create garbage, and thus it would be good if detection and correction of the mismatch can be made as fast as possible. The indication could include also the corresponding COUNT value so that the eNB could check if the integrity check failure was caused by COUNT mismatch or if an intruder injecting packets caused it. No further action is needed by the UE, as according to observation 1, there is no impact from IP failure on one DRB on other DRBs.

We tend to think alternative 2 would be appropriate in order to enable quick detect and remedy a mismatch in COUNT, but would like to ask SA3 for guidance in this matter. We have provided a draft LS in R2-170xxxx, Draft LS to SA3.

Send LS to SA3 asking appropriate action upon DRB integrity protection failure.

Conclusion: We made the following observations:
Observation 1 Integrity protection failure on one DRB will not affect integrity procedure check of another DRB
Observation 2 For relay nodes, packets for which integrity protection fails are simply discarded.

Based on the discussion in section Error! Reference source not found. we propose the following:
Proposal 1 Send LS to SA3 asking appropriate action upon DRB integrity protection failure.

Certain embodiments of the present disclosure may provide one or more technical advantages. For example, certain embodiments may enable the network to quickly detect and remedy possible integrity check failures. In certain embodiments, failure detection may be quicker and more reliable than a currently defined counter check procedure which is a network triggered procedure to check a current COUNT value of the wireless device. Another technical advantage may be that graceful recovery mechanisms that do not include releasing all of the DRBs and SRBs for the wireless device.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:

| Abbreviation | Explanation |
| --- | --- |
| AP | Application Protocol |
| CP | Control Plane |
| DC | Dual Connectivity |
| DL | Downlink |
| DRB | Data Radio Bearer |
| eNB | LTE Base station |
| gNB | Next generation base station |
| E-RAB | EUTRAN Radio Access Bearer |
| EUTRAN | Evolved Universal Terrestrial Radio Access Network |
| GTP-U | GPRS Tunneling Protocol - User Plane |
| IP | Internet Protocol |
| LTE | Long Term Evolution |
| MCG | Master Cell Group |
| MAC | Medium Access Control |
| MeNB | Master eNB |
| MN | Master Node |
| NG | Next Generation |
| NR | New Radio |
| PCell | Primary Cell |
| PDCP | Packet Data Convergence Protocol |
| RAT | Radio Access Technology |
| RLC | Radio Link Control |
| RRC | Radio Resource Control |
| SCG | Secondary Cell Group |
| SCTP | Stream Control Transmission Protocol |
| SeNB | Secondary eNB |
| SgNB | Secondary NG Base station |
| SN | Secondary Node |
| SN | Sequence Number |
| SRB | Signaling Radio Bearer |
| TEID | Tunnel Endpoint IDentifier |
| TNL | Transport Network Layer |
| UDP | User Datagram Protocol |
| UE | User Equipment |
| UL | Uplink |
| UP | User Plane |

The invention claimed is:

1. A method in a wireless device comprising:
   detecting an integrity check failure associated with a Packet Data Convergence Protocol (PDCP) data Protocol Data Unit (PDU);
   in response to detecting the integrity check failure, discarding the PDCP data PDU;
   sending a first indication to a network node, the first indication informing the network node of the integrity check failure, wherein the first indication comprises information that includes a downlink (DL) COUNT for the PDCP data PDU associated with the integrity check failure; and
   receiving a second indication indicating cause of the integrity check failure, wherein the cause is determined by the network node upon checking value of the DL COUNT received from the wireless device and comparing it with its own local value of DL COUNT associated with a Bearer ID included in the received integrity check failure indication, wherein if the DL COUNT received from the wireless device matches with the local value of DL COUNT, the second indication indicates that the DL count received from the wireless device is correct and the cause of the integrity check failure is one or more bit-errors in the PDCP packet, and wherein if the DL COUNT received from the wireless device is not-matched with the local value of DL COUNT, the second indication indicates that there is a mismatch between the DL COUNT in network and the wireless device.

2. The method of claim 1, wherein the indication comprises one of following:
   an RRC control message;
   the PDCP control PDU; and
   a MAC Control Element.

3. The method of claim 1, wherein the information further includes one or more of the following:
   the Bearer ID for the PDCP data PDU associated with the integrity check failure;
   a Message Authentication Code-Integrity (MAC-I) received in the PDCP data PDU associated with the integrity check failure; and
   the PDCP data PDU associated with the integrity check failure.

4. The method of claim 1, further comprising:
   detecting an integrity check success after detecting the integrity check failure; and
   sending an indication to the network node identifying the integrity check success.

5. A wireless device comprising:
   processing circuitry, the processing circuitry configured to:
   detect an integrity check failure associated with a Packet Data Convergence Protocol (PDCP) data Protocol Data Unit (PDU);
   in response to detecting the integrity check failure, discard the PDCP data PDU;
   send a first indication to a network node, the first indication informing the network node of the integrity check failure, wherein the first indication comprises information that includes a downlink (DL) COUNT for the PDCP data PDU associated with the integrity check failure; and
   receive a second indication indicating cause of the integrity check failure, wherein the cause is determined by the network node upon checking value of the DL COUNT received from the wireless device and comparing it with its own local value of DL COUNT associated with a Bearer ID included in the received integrity check failure indication, wherein if the DL COUNT received from the wireless device matches with the local value of DL COUNT, the second indication indicates that the DL count received from the wireless device is correct and the cause of the integrity check failure is one or more bit-errors in the PDCP packet, and wherein if the DL COUNT received from the wireless device is not-matched with the local value of DL COUNT, the second indication indicates that there is a mismatch between the DL COUNT in network and the wireless device.

6. The wireless device of claim 5, wherein the indication comprises one of following:
   an RRC control message;
   the PDCP control PDU; and
   a MAC Control Element.

7. The wireless device of claim 5, wherein the information further includes one or more of the following:
- the Bearer ID for the PDCP data PDU associated with the integrity check failure;
- a Message Authentication Code-Integrity (MAC-I) received in the PDCP data PDU associated with the integrity check failure; and
- the PDCP data PDU associated with the integrity check failure.

8. The wireless device of claim 5, wherein the processing circuitry is further configured to:
- detect an integrity check success after detecting the integrity check failure; and
- send an indication to the network node identifying the integrity check success.

9. A non-transitory device-readable medium having stored thereon instructions that, when executed by processing circuitry of a user equipment, cause the user equipment to:
- detect an integrity check failure associated with a Packet Data Convergence Protocol (PDCP) data Protocol Data Unit (PDU);
- in response to detecting the integrity check failure, discard the PDCP data PDU;
- send a first indication to a network node, the first indication informing the network node of the integrity check failure, wherein the first indication comprises information that includes a downlink (DL) COUNT for the PDCP data PDU associated with the integrity check failure; and
- receive a second indication indicating cause of the integrity check failure, wherein the cause is determined by the network node upon checking value of the DL COUNT received from the wireless device and comparing it with its own local value of DL COUNT associated with a Bearer ID included in the received integrity check failure indication, wherein if the DL COUNT received from the wireless device matches with the local value of DL COUNT, the second indication indicates that the DL count received from the wireless device is correct and the cause of the integrity check failure is one or more bit-errors in the PDCP packet, and wherein if the DL COUNT received from the wireless device is not-matched with the local value of DL COUNT, the second indication indicates that there is a mismatch between the DL COUNT in network and the wireless device.

10. The non-transitory device-readable medium of claim 9, wherein the indication comprises one of following:
- an RRC control message;
- the PDCP control PDU; and
- a MAC Control Element.

11. The non-transitory device-readable medium of claim 9, wherein the information further includes one or more of the following:
- the Bearer ID for the PDCP data PDU associated with the integrity check failure;
- a Message Authentication Code-Integrity (MAC-I) received in the PDCP data PDU associated with the integrity check failure; and
- the PDCP data PDU associated with the integrity check failure.

12. The non-transitory device-readable medium of claim 9, wherein the instructions further cause the user equipment to:
- detect an integrity check success after detecting the integrity check failure; and
- send an indication to the network node identifying the integrity check success.

* * * * *